United States Patent [19]
Webber et al.

[11] Patent Number: 5,672,050
[45] Date of Patent: Sep. 30, 1997

[54] APPARATUS AND METHOD FOR MONITORING A SUMP PUMP

[75] Inventors: Daniel J. Webber, Conifer, Colo.; Wesley Ratulowski, Chicago Ridge, Ill.

[73] Assignee: Lynx Electronics, Inc., Lemont, Ill.

[21] Appl. No.: 511,255

[22] Filed: Aug. 4, 1995

[51] Int. Cl.⁶ .................................................. F04B 49/00
[52] U.S. Cl. ...................... 417/18; 417/38; 417/44.2; 417/53; 417/63; 73/753
[58] Field of Search ..................... 417/18, 36, 38, 417/40, 41, 44.1, 44.2, 53, 63; 73/862.581, 753

[56] References Cited

U.S. PATENT DOCUMENTS

| | | | |
|---|---|---|---|
| 3,634,842 | 1/1972 | Niedermeyer | 340/244 |
| 3,717,421 | 2/1973 | Schaefer | 417/38 |
| 3,726,606 | 4/1973 | Peters | 417/7 |
| 3,902,028 | 8/1975 | Tremain | 200/81 R |
| 3,932,853 | 1/1976 | Cannon | 340/244 B |
| 4,087,204 | 5/1978 | Niedermeyer | 417/38 |
| 4,187,503 | 2/1980 | Walton | 340/624 |
| 4,195,968 | 4/1980 | Emeny | 417/17 |
| 4,222,711 | 9/1980 | Mayer | 417/36 |
| 4,422,829 | 12/1983 | Buchanan | 417/40 |
| 4,456,432 | 6/1984 | Mannino | 417/63 |
| 4,645,426 | 2/1987 | Hartley et al. | 417/38 |
| 4,705,456 | 11/1987 | Gardeen | 417/63 |

OTHER PUBLICATIONS

National Semiconductor, "LM3914 Dot/Bar Display Driver—Typical Applications"; pp. 4–97 through 4–111 no date.
National Semiconductor, "CD4020BM/CD4020BC 14–Stage Ripple Carry Binary Counters; CD4040BM/CD4040BC 12–Stage Ripple Carry Binary Counters, and CD4060BM/CD4060BC 14–Stage Ripple Carry"; pp. 5–67 through 5–71 no date.

(List continued on next page.)

Primary Examiner—Timothy Thorpe
Assistant Examiner—Xuan M. Thai
Attorney, Agent, or Firm—Wallenstein & Wagner, Ltd.

[57] ABSTRACT

An apparatus and method for monitoring and controlling a motor driven sump pump. The apparatus and method includes a power supply which powers the apparatus, a sensing portion which detects the level of the liquid within the sump, a control portion which turns the motor either off or on in response to the level of the liquid, and an alarm portion cooperating with the sensor which activates an alarm when a preselected level has been reached. The apparatus and method also includes power failure detection portion cooperating with the alarm portion which activates an alarm when a power failure occurs, a fault detection portion cooperating with the alarm portion which activates an alarm when the fault condition occurs, and a disabling portion which disables the pump when the fault detection portion detects a fault condition in the pump.

38 Claims, 3 Drawing Sheets

OTHER PUBLICATIONS

Harris Semiconductor, "ICL7673 Automatic Battery Back-up Switch"; pp. 2-149 through 2-155 no date.

National Semiconductor, "Operational Amplifiers/Buffers" no date.

Grayhill "Binary Coded Rotary Dip Switch"; pp. B-13 and B-14 no date.

Coilcraft "50/60 Hz Current Sensor -CS60-010" no date.

Murata Manufacturing Co. Ltd., "Specification of Piezoelectric Alarm" no date.

Motorola Thyristor Device Data, "Drivers: The MOC3011 Non-Zero Crossing Triac Driver," pp. 1-3-14 -1-3-16 no date.

Motorola CMOS Application -Specific Digital-Analog Integrated Circuits, "Motorola Semiconductor Technical Data -MC14467-1" no date.

Burr-Brown Corporation, "INA118 Precision, Low Power Instrumentation Amplifier," pp. 1-12 date unknown.

I&CS Jun. 1994, "LIT & Products -Temperature Control," p. 32 (date unknown).

National Semiconductor Application Brief 10, "Fluid Level Control Systems Utilizing the LM1830," p. AB-10 date unknown.

Literature on Upright Sewage Ejector Pump date unknown.

Motorola Semiconductor Technical Data, "MPX7050 Series," pp. 2-18 -2-20 date unknown.

Motorola Thyristor Device Data, "Triacs," pp. 3-142-3-144 date unknown.

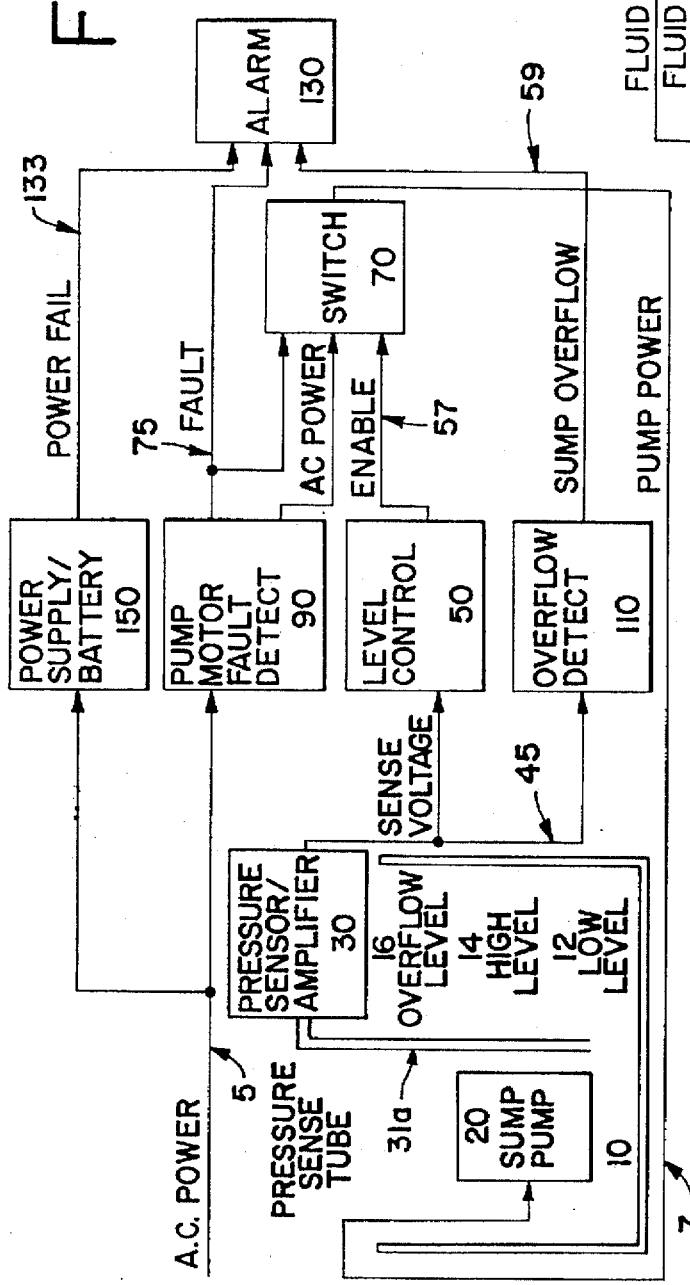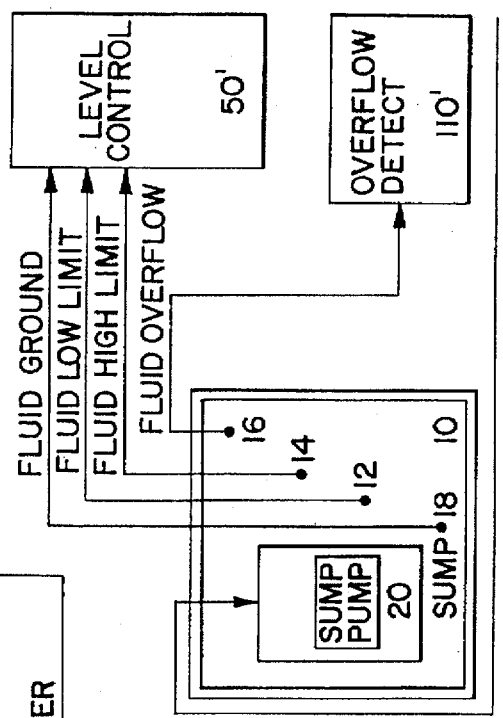

APPARATUS AND METHOD FOR MONITORING A SUMP PUMP

BACKGROUND OF THE INVENTION

Generally, a sump is a hole placed at the lowest point in a structure, such as a building, underground passage way, or a mine, permitting water to drain therein for pumping out or removal therefrom. A pump used to pump liquid, such as water, out of a sump is called a sump pump. By pumping water from the sump to a point outside the structure with the sump, the sump pump prevents these structures from flooding.

A sump pump is typically controlled by a flat activated switch. Both the pump and its control switch are typically immersed in water for long periods of time. Eventually this causes the pump and/or its control switch to corrode, which can lead to several problems, including faults in the pump. If these problems go undetected, flooding will unfortunately result.

Furthermore, sludge buildup and foreign objects may become lodged in the pump affecting the proper functioning of the sump pump. As a result, flooding can again occur. Often, such problems are not discovered until it is too late to prevent flooding and possibly significant damage. The present invention significantly assists in detecting problem conditions both with the equipment and the liquid level and in controlling the equipment to prevent flooding and eventual damage.

SUMMARY OF THE INVENTION

The present invention is directed to an apparatus and method for monitoring and controlling a motor driven sump pump. The apparatus includes a pressure sensing means for detecting the pressure resulting from the height of the upper surface of the liquid within the sump. The apparatus also includes a control means cooperating with the pressure sensing means for turning the motor either "on" or "off" when the detected pressure is either above or below, respectively, at least one first preselected pressure. The pressure sensing means can include a pressure sensing tube which has an opening at a lower end and a sensor therein. When a pressure tube is used, the opening of the tube is submerged in and below the upper surface of the liquid within the sump. The sensor detects pressure in the tube and the pressure in the tube is proportional to the height of the upper surface of the liquid within the sump.

The apparatus also includes a first alarm means, which cooperates with the pressure sensor, for activating an alarm when the detected pressure is above at least one second preselected pressure. In addition, the apparatus includes a power means for supplying power to the apparatus, a power detection means for detecting a power failure in the power means, and a second alarm means for activating an alarm when the power detection means detects a power failure in the power means. The apparatus also includes a fault detection means for detecting a fault condition in the pump, a third alarm means for activating an alarm when the fault detection means detects a fault condition in the pump, and a disabling means for disabling the pump when the fault detection means detects a fault condition in the pump.

The present invention also includes a method for monitoring and controlling a motor driven sump pump. The method includes detecting the pressure resulting from the height of the upper surface of the liquid within the sump, turning the motor either "on" or "off" when the detected pressure is either above or below, respectively, at least one first preselected pressure, and activating an alarm when the detected pressure is above at least one second preselected pressure. The method also includes supplying power to the sump pump, detecting a power failure in supplying the power, and activating an alarm when a power failure is detected. Furthermore, the method includes the steps of detecting a fault condition in the pump, activating an alarm when a fault condition is detected in the pump, and disabling the pump when a fault condition is detected in the pump.

Many advantages exist as a result of this sump pump design and method. Some of these advantages are that detection of problems with the apparatus takes place and the pump is shut down in response to the problems. In addition, not only is one level of the liquid within the sump continuously monitored and controlled, but a plurality of levels are monitored and controlled in response thereto. Furthermore, an audible alarm, as well as light indicators, are provided to give notification of when normal and alarm conditions exist. These alarm condition notifications, and other control actions, take place before the level of the liquid within the sump floods into the structure or underground passage way.

For example and more specifically, if a corroded bearing or a foreign object lodged in the sump pump prevents the pump motor from turning, a pump monitor detects this condition and responds by activating an alarm and removing electrical power from the pump motor. The alarm is also activated if the fluid level rises above a preset level or if a loss of AC power prevents the pump motor from functioning. In addition to activating an alarm, the sump pump monitor indicates the condition that caused the alarm to sound. The sump pump monitor uses light emitting diodes to indicate the cause of the alarm.

In general, the present sump pump monitoring apparatus and method detects the fluid level in a sump and controls the electrical power applied to the sump pump in order to maintain an optimum fluid level. It also calls attention to a pump failure, allowing the failure to be corrected and avoiding flood damage to the structure containing the sump pump.

Other advantages and aspects of the present invention will become apparent upon reading the following description of the drawings and the detailed description of the invention.

BRIEF DESCRIPTION OF DRAWINGS

To understand the present inventions, it will now be described by way of example, with reference to the accompanying drawings in which:

FIG. 1 is a block diagram of a first embodiment of the apparatus of the present invention;

FIG. 2 is a partial block diagram of a second embodiment of the apparatus of the present invention;

DETAILED DESCRIPTION

Figure 3:
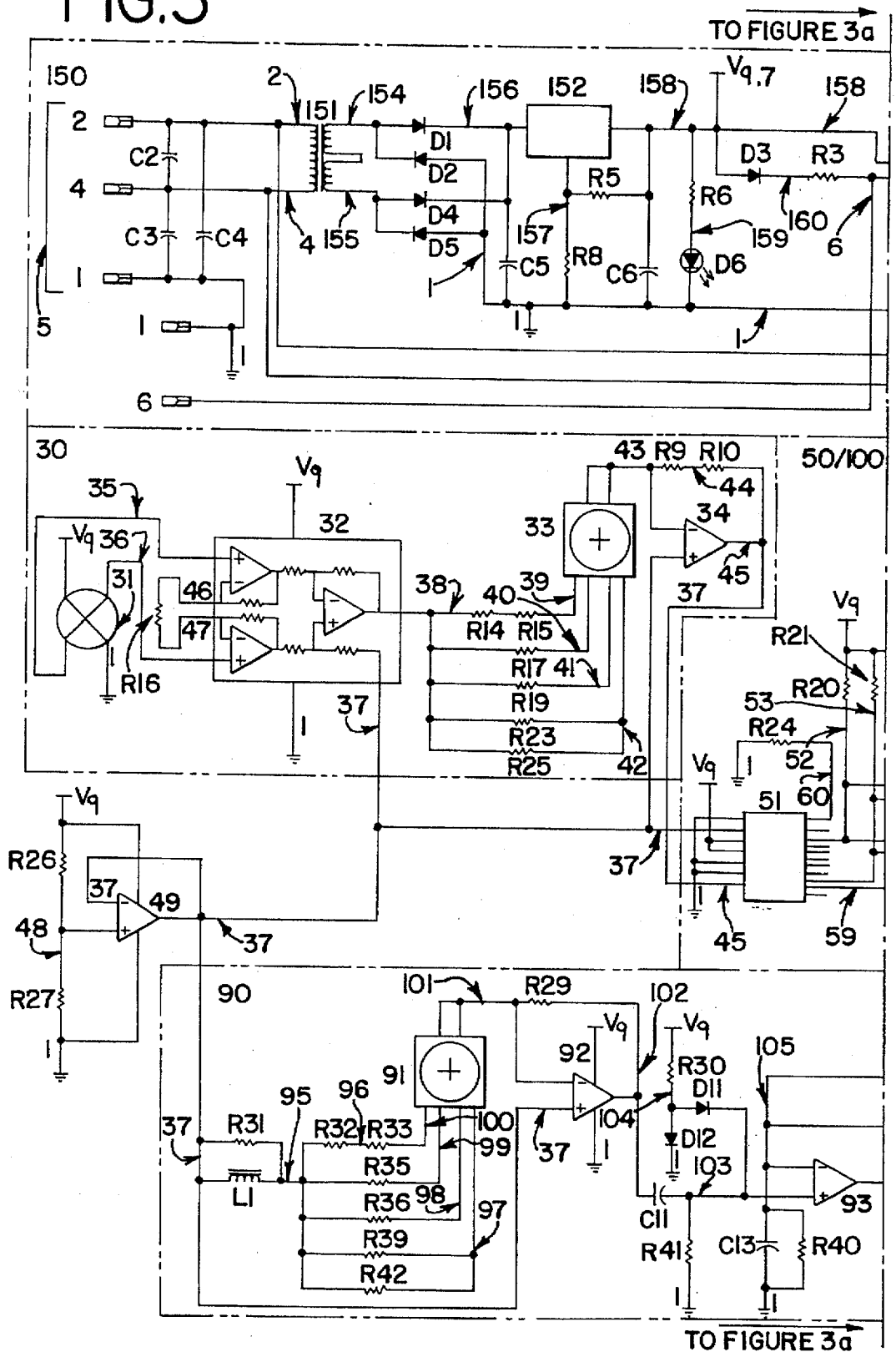
FIG. 3 is the first part of a schematic diagram of the first embodiment of the apparatus of the present invention; and, FIG. 3a is the second part of the schematic diagram of FIG. 3.

While this invention is susceptible of embodiments in many different forms, there is shown in the drawings and will herein be described in detail, preferred embodiments of the invention with the understanding that the present disclosure is to be considered as an exemplification of the principles of the invention and is not intended to limit the broad aspects of the invention to the embodiments illustrated.

Referring to FIGS. 1 and 2, a first and a second embodiment of the apparatus of the present invention are shown, respectively, for monitoring and controlling a motor driven sump pump. The sump, generally designated with the reference numeral 10, includes a pump 20 located within the sump 10. Typically, the pump motor 20 is not physically within the sump 10, although it can be within the sump 10. A pipe (not shown) is usually submerged within the liquid, such as water, in the sump 10. In this configuration, the pipe connects to the pump 20, and the motor of the pump 20 is mounted outside and above the sump 10.

A plurality of operative/action levels are predetermined within sump 10 in both the FIG. 1 and FIG. 2 embodiments. Specifically, a low level 12, a high level 14, an overflow level 16, and a ground level 18 are predetermined at vertical positions within sump 10. These predetermined levels in the FIG. 2 embodiment mark the points or positions where the upper surface of the liquid within sump is at a height that has at least reached a "low height," a "high height," an "overflow height," and a "ground height," respectively, for the embodiment in Figure, described further below. A "low height" signifies a level determined to be the minimum depth at which the pump should operate; a "high height" signifies the highest acceptable fluid level without any danger of overflow; an "overflow height" signifies a level which is close to actual overflow, but allows for time to react to this condition without actual overflow occurring; and, a "ground height", only in the second embodiment, signifies the bottom of the sump. Similar heights can be used for the FIG. 1 embodiment.

Figure 3A:
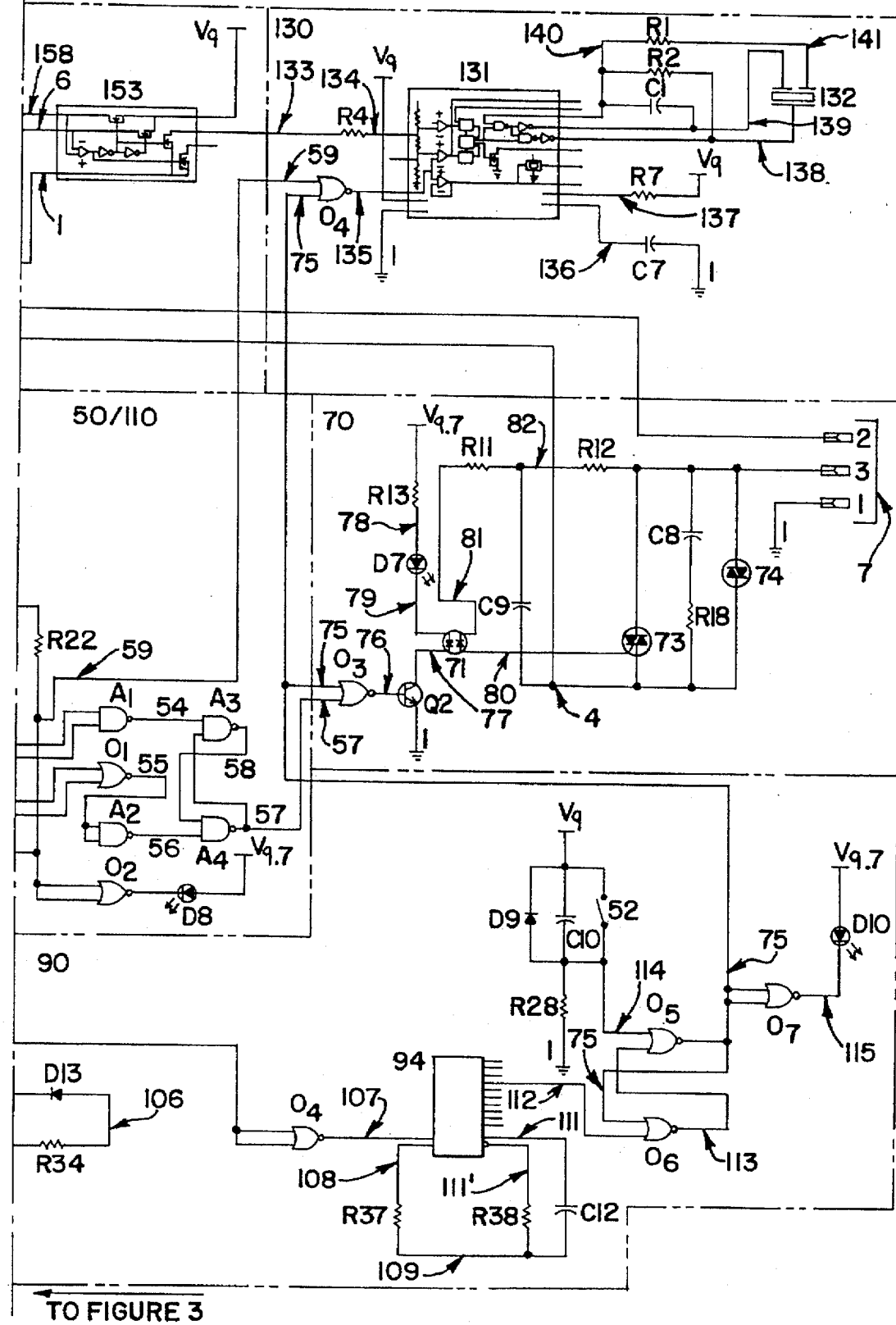

FIG. 1 also shows a conventional power means or power supply/battery backup system 150 for supplying power to the apparatus. Wall A.C. power 5 is connected to the power supply system 150. Turning to FIGS. 3 and 3a, depicting the embodiment from FIG. 1, the power supply system 150 includes a ground lead 1, a power lead 2, a neutral lead 4, and a battery power lead 6. These ground, power and neutral leads or terminals 1,2,4 comprise a standard AC 110 Volt/60 Hz power connection and make up the wall power connection 5. The ground and battery power terminals 1,6 likewise make up a standard DC battery power connection. Three capacitors C2,C3,C4, each having a value of 0.001 uF, are connected to the ground, power and neutral terminals 1,2,4. The power supply system 150 also includes a transformer 151 (MCI Transformer Corp. Part No. MCI-4-03-2010) for transforming the wall power 5 to a useable power. The power and neutral leads 2,4 are connected to one side of this transformer 151, and first and second output leads 154,155 are connected to the other end of transformer 151.

Diodes D1,D2,D4,D5 are connected to the first and second output leads 154,155, to a third output lead 156 and to the ground lead 1. These standard diodes D1,D2,D4,D5 can be connected from a standard semiconductor chip or chips. A further capacitor C5 is also connected to the third output lead 156 and the ground lead 1. This further capacitor C5 can have a value of 220 uF. The power supply system 150 additionally has a standard adjustable positive output regulator 152 connected to the output lead 156 and two connecting leads 157,158. A suitable regulator 152 is Motorola inc.'s Regulator No. LM317. Resistors R5 (300 Ohms) and R8 (2 KOhms) are connected to the first connecting lead 157, with one resistor R8 being connected to the ground lead 1 and the other resistor R5 being connected to the second connecting lead 158. An additional capacitor C6 (4.7 uF) is also connected the second connecting lead 158 and to the ground lead 1.

The second connecting lead 158 is pulled up to +9.7 volts DC by lead $V_{9.7}$. This second connecting lead 158 is also connected to a resistor R6 (1 KOhms), a diode D3, and an automatic battery backup switch 153. This just noted resistor R6 is further connected to a "power on" light emitting diode D6 through a lead 159, this light emitting diode D6 is further connected to the ground lead 1.

An additional diode D3 is further connected to a resistor R3 (1.5 MOhms) through a lead 160; the resistor R3 is further connected to a battery lead 6. The battery lead 6 is also connected to automatic battery backup switch 153 (Harris Semiconductor No. ICL77673). The switch 153 is connected to the ground lead 1 and the second connecting lead 158. The switch 153 is additionally connected to lead $V_9$ which is at +9 volts DC. This switch 153 can also be a power detection means for detecting a power failure or loss of A.C. power from the wall power connection 5.

As shown in FIG. 1, a pressure sensing tube having two ends, one being open, is connected at one end (the non-opened end) to a pressure sensor/amplifier portion 30. The tube 31a and its open end are extended into the sump 10. Attached to one end of the tube 31a, there is a sensor 31 which senses the differential pressure between atmospheric pressure outside the tube and the pressure within the tube (FIG. 3). The opening of the tube 31a is submerged in and below the upper surface of the liquid within the sump 10, and the sensor 31 detects differential pressure between atmospheric pressure and the pressure in the tube 31a. The tube 31a is physically attached to the pressure sensor 31, depicted in the pressure sensor/amplifier portion as reference number 30.

The pressure in the tube 31a is proportional to the height of the upper surface of the liquid within the sump 10. Thus, the pressure sensing means 31 detects the pressure resulting from the height of the upper surface of the liquid within the sump 10. In addition, more than one sensor can be used to detect both the atmospheric pressure and the pressure resulting from the height of the upper surface of the liquid within the sump 10, and these pressure values can be compared. The pressure sensing portion 30 also incorporates conversion means for (10) comparing the atmospheric pressure and the detected pressure resulting from the height of the liquid within the sump and (2) for generating a gauge pressure.

The details in FIGS. 3 and 3a of the specific embodiment of FIG. 1 show the pressure sensor/amplifier portion 30 includes the pressure sensor 31 (Motorola Inc. No. MPX7050) connected to +9 volts DC $V_9$, the ground lead 1, lead 35 and lead 36. Leads 35 and 36 are further connected to an amplifier 32 (Burr-Brown No. INA118). This amplifier 32 is further connected to +9 volts DC $V_9$, the ground lead 1, lead 37, lead 38, and leads 46 and 47. Leads 46 and 47 are connected via a resistor R16 (510 Ohms). Output lead 38 from the amplifier 32 is further connected to an overflow level select 33 (Greyhill Binary Coded Rotary DIP Switch Part No. 94HAC16), through two resistors R14,R15 in series (each 2 KOhms) (through lead 39), and through other resistors R17 (2 KOhms) (through lead 40), R19 (1 KOhms) (through lead 41), R23 (1 KOhms) (through lead 42), R25 (1 KOhms) (also through lead 42 in series with resistor R23).

The select 33 output lead 43 is connected (1) to a series of resistors R9 (3.9 KOhms), R10 (300 Ohms) via line 44 to the output lead 45 of an operational amplifier 34 (National Semiconductor No. LM358N), and (2) directly to the negative (−) input terminal of the same operational amplifier 34. The output lead 45 is further connected to a level control/overflow detect portion 50/100. The operational amplifier has a further, second input lead 37, which extends into the positive (+) terminal of the amplifier 34, and is connected to the level control/overflow detect portion 50/100, the earlier noted amplifier 32, the output and negative (−) input of an additional amplifier 49, as well as a pump motor fault detect portion 90.

This latter amplifier 49 is further connected to +9 volts DC $V_9$, the ground lead 1, and an input lead 48. The input lead 48 for this operational amplifier 49 connects a series of resistors R26,R27 (each 5.1 KOhms).

The pressure sensor portion 30 is connected to a level control portion 50 and an overflow detect portion 110 through output lead 45, the level control portion 50 and the overflow detect portion 110 creating the noted control portion 50/110. This level control position 50/110 includes a Dot/Bar Display Driver 51 (National Semiconductor No. LM3914). Several pins of the display driver 51 are connected to +9 volts DC $V_9$, and several pins of this display driver are connected to the ground lead 1. In addition, the output lead 45 supplies the signal-in and represents the liquid pressure within the partially submerged tube 31a. Another lead 37 is also an input to the display driver 51 and is further used as a reference signal. The outputs from the display driver 51 include four leads 52,53,59,60. The first output lead 53 is connected to a resistor R21 (10 KOhms) pulled up to +9 volts DC $V_9$ along with resistors R20 (10 KOhms) and R22 (10 KOhms). This same first output lead 53 is also connected to an input of a first NAND gate $A_1$ and an input of a first NOR gate $O_1$. The third output lead 60 connects an additional resistor R24 (5.1 KOhms) to the display driver 51, and is further connected to the ground lead 1 as shown. A fourth output lead 52 from the display driver 51 is connected to resistor R20, an input of the first NAND gate $A_m$, and an input to the first NOR gate $O_1$. In addition, the second output lead 59 from the display driver 51 is connected to a resistor R22, to both inputs of a second NOR gate $O_2$, and to the alarm portion 130 of the system (the input of a fourth NOR gate $O_4$).

The output of the second NOR gate $O_2$ is connected to a "sump overflow" light emitting diode D8 which is further connected to a +9.7 volts DC $V_{9.7}$. The output lead 55 of the first NOR gate $O_1$ is connected to both inputs of the second NAND gate $A_2$, with the output lead 56 of the second NAND gate $A_2$ connected to an input of a fourth NAND gate $A_4$. The output lead 54 of the first NAND gate $A_1$ is connected to an input of a third NAND gate $A_3$. The third NAND and fourth NAND gates $A_3, A_4$ are latched; the output lead 58 of the third NAND gate $A_3$ is connected to an input of the fourth NAND gate $A_4$, while the output lead 57 of the fourth NAND gate $A_4$ is connected an input of the third NAND gate $A_3$. This last noted output lead 57 is further connected to power switch portion 70 (an input of a third NOR gate $O_3$.

The above control means cooperates with the pressure sensing means and conversion means to turn the pump motor either "off" or "on" through the switch portion 70. The switch portion 70 is either activated or deactivated by the control portion 50/110 when the detected pressure, or gauge pressure, sensed within the sensing portion 30 is either above or below at least one first preselected pressure representing a particular level of liquid within the sump.

FIG. 1 further depicts one embodiment of the present invention with a pump motor fault detect portion 90 monitoring the A.C. power flowing through the power switch 70 and ultimately through the sump pump 20. Thus, there is at least an indirect link to the AC power which is flowing into the pump 20. The fault detect portion 90 is also connected to the alarm portion 130 and the power switch 70. This fault detection means is used for detecting a fault condition in the pump 20. The switch portion 70 is used as a disabling means for disabling the pump 20 when the fault detection means detects a fault condition in the pump 20. The fault detection portion 90 communicates the fault condition to the switch portion 70 through a lead 75 when a fault condition is detected. This lead 75 also connects the fault detect 90 with an alarm portion 130.

This fault detect portion 90 includes a neutral wire current sense inductor L1 (Coilcraft No. CS60-010). The lead 37 into the fault detect portion 90 is connected to the inductor L1 and a resistor R31 (100 Ohms), in parallel to an output lead 95. This lead 37 is further connected to the positive +input of an operational amplifier 92. Output lead 95 is further connected to a pump motor fault sensitivity select rotary DIP switch 91 (Greyhill No. 94HAC16), via the following resistors and leads: a) a resistor R32 (2 KOhms) (in series with a further resistor R33 (2 KOhms)) along leads 96,100, b) a resistor R35 (2 KOhms) along lead 99, c) a resistor R36 (1 KOhms) along lead 98, d) a resistor R39 (1 KOhms along lead 97, and e) a resistor R42 (1 KOhms along lead 97.

The select 91 is further connected to an input lead 101 with a resistor R29 (68 KOhms and the input of an additional amplifier 92 (National Semiconductor No. LM358N). This amplifier 92 is further connected to +9 volts DC $V_9$ and the ground lead 1. The output of the amplifier 92 is connected to a lead 102, also connected to the resistor R29 and to a capacitor C11 (0.1 uF). This capacitor C11 is connected to a further lead 103, connected to a resistor R41 (1.5 MOhms), a diode D11, and the positive +input of a further operational amplifier 93. The diode D11 is connected to a second diode D12 and a resistor R30 (10 KOhms) through this lead 104. The resistor R30 is tied to +9 volts DC $V_9$, and the second diode D12 is tied to ground lead 1.

The input of the just noted amplifier 93 is connected to a lead 105 which is further connected to a capacitor C13 (0.47 uF), a resistor R40, a diode D13, and both inputs of a fourth NOR gate $O_4$. This capacitor C13 and resistor R40 (1.5 MOhms) are further tied to the ground lead 1. As shown, the output of this amplifier 93 is connected to a resistor R34 (1 KOhms), which is, in turn, connected to the diode D13 through the lead 106.

The output lead 107 of the fourth NOR gate $O_4$ is connected to a reset input of ripple counter 94 (National Semiconductor No. CD4060). An input lead 108 connected to CLKI pin (not shown) of this counter 94 is connected to a resistor R37 (10 KOhms) which is further connected to another resistor R38 (10 KOhms) and capacitor C12 (0.1 uF) as shown. This latter resistor R38 is further connected to the inverted CLKO pin (not shown) of the counter 94, while a capacitor C12 is further connected to the CLKO pin (not shown) of the counter 94. The pin Q10 (not shown) is then connected to an input of a sixth NOR gate $O_6$, the fifth NOR gate $O_5$ and sixth NOR gate $O_6$ being latched together. The output lead 113 from the sixth NOR gate $O_6$ is connected to an input of the fifth NOR gate $O_5$, while the output lead 75 from the fifth NOR gate $O_5$ is connected to an input of the sixth NOR gate $O_6$. A lead 114 is also input into the fifth NOR gate $O_5$ and used to reset a fault condition through a fault reset portion. Thus, this lead 114 is connected to the fault reset portion, which includes this lead 114 connected to a resistor R28 (10 KOhms), a diode D9, a capacitor C10 (4.7 uF), and a switch S2. This resistor R28 is further tied to the ground lead 1, while the diode D9, the capacitor C10, and the switch S2 are all tied to $V_9$.

Within the fault detect portion 90, both inputs of a seventh NOR gate $O_7$ are connected to the output lead 75 from the fifth NOR gate $O_5$, while the output lead 115 from the seventh NOR gate $O_7$ is connected to a "pump fault" light emitting diode D10. This diode D10 is further tied to +9.7 volts DC $V_{9.7}$. The output lead 75 is further connected to a power switch portion 70 (an input of the third NOR gate $O_3$), and to the alarm portion 130 (an input of the fourth NOR gate $O_4$).

Returning to FIG. 1, the power switch portion 70 is connected to the sump pump 20 through a connection 7; the overflow detect portion 110 is connected to the alarm portion 130 through the second output lead 59; the power supply/battery system 150 is connected to the alarm portion 130 through a lead 133; and, the level control portion 50 is connected to the power switch portion 70 through a lead 57. Thus, the alarm portion 130, or alarm means, cooperates with the sensing portion 30, or conversion means, through the control portion 50/110, and activates an alarm when the detected pressure, or gauge pressure, is above a pressure which represents a particular preselected level of liquid within the sump. The alarm portion 130, or alarm means, is also used for activating an alarm when the power detection means, or battery backup switch 153, within power supply system 150, detects a power failure in power supply system 150. The alarm portion 130, or alarm means, is additionally used for activating an alarm when the fault detection portion 90, or fault detection means, detects a fault condition in the sump pump 20.

In FIGS. 3 and 3a, the power switch portion 70 shows an output lead 76 from the third NOR gate $O_3$ being connected to a base of a BJT transistor Q2. The emitter of this transistor Q2 is tied to the ground lead 1, and the collector terminal of the transistor Q2 is connected to a lead 77, which is further connected to an opto-isolator 71 (Motorola Part No. MOC3011), this opto-isolator 71 is further connected to three leads 79, 80, and 81. Lead 79 is connected to a "pump on" light emitting diode D7, which is further tied to a resistor R13 (1 KOhms) through lead 78. This lead 78 is tied to a 9.7 volts DC $V_{9.7}$. The other lead 80 is further connected to a triac 73 (Motorola No. MAC218FP). The other lead 81 is further connected to a series of resistors R11 (390 Ohms), R12 (560 Ohms) and a capacitor C9 (0.1 uF) through lead 82, as shown. A neutral lead 4 from the power supply system 150 is connected to this capacitor C9, triac 73, resistor R18 (33 Ohms), and Metal-Oxide Varistor (MOV) 74. This resistor R18 is further connected to a capacitor C8 (0.1 uF), which is further connected to a switch lead 3; and, the switch lead 3 connects this capacitor C8 to a resistor R12, the triac 73, and the MOV 74. FIG. 3a also shows the power switch portion 70 having a ground lead 1 and a power lead 2, along with a switch lead 3; together, these leads make up the pump power 7. As mentioned above, the pump power 7 is connected to the sump pump 20.

FIG. 3a further shows the alarm portion 130 shown in FIG. 1. Specifically, the lead 133 from the switch 153 within the power supply system 150 is connected to a resistor R4 (100 KOhms) which is connected to a detector 131 (Motorola Part No. MC14467-1). The output lead 135 from the fourth NOR gate $O_4$ is also connected to the detector 131. Furthermore, the detector 131 is connected to $V_9$, to the ground lead 1, to a connection lead 136, and to another connection lead 137. The first connection lead 136 is connected to a seventh capacitor C7 (0.1 uF), which is further connected to the ground lead 1. The second connection lead 137 is connected to a seventh resistor R7 (8.2 MOhms), which is in turn connected to +9 volts DC $V_9$. The detector 131 is further connected to several output leads 138,139, 140. One output lead 138 is connected to a second resistor R2 and in turn to a piezoelectric alarm 132 (Murata Erie Part No. PKM29-3AO). Another output lead 139 is also connected to a piezoelectric alarm 132, and to a first capacitor C1 (1 nF). Another output lead 140 is connected to a first resistor R1 (100 KOhms), which is in turn connected to the piezoelectric alarm 132 through a further output lead 141, and output lead 140 is also connected to a second resistor R2 (1.5 MOhms) and to the first capacitor C1, as shown.

The pressure sensing tube 31a has an opening at a one end (or a lower end), and a differential pressure sensor at the other end (or an upper end) of the tube 31a for detecting the difference (differential pressure) between the pressure inside the tube 31a and the pressure outside the tube 31a. The opening is submerged in and below the upper surface of the liquid within the sump 10, and the differential pressure sensor 31 detects the differential pressure as described above. The differential pressure or pressure in the tube is proportional to the height of the upper surface of the liquid within the sump 10 as will be further described below.

FIG. 2 is an example of a portion of another embodiment of the present invention. As in FIG. 1, FIG. 2 depicts a sump 10 and a pump 20 for pumping liquid out of the sump 10. However, the embodiment of FIG. 2 uses a plurality of sensors for detecting a relative height of the upper surface of the liquid within the sump 10. More specifically, FIG. 2 depicts a sensor positioned at a ground level 18, a low level 12, a high level 14, and an overflow level 16 within the sump 10. Thus, the plurality of sensors can include, but is not limited to, a ground level sensor, a low level sensor, a high level sensor, and an overflow level sensor. These sensors can be used in place of the pressure tube 31a and in place of the pressure sensing portion 30. These plurality of sensors connect directly to the control means, or the level control 50' and the overflow detect 110', and the control means cooperates with the sensors for at least turning the motor either "on" or "off" when the upper surface is either above or below, respectively, one of the sensors.

The plurality of sensors cooperate with the control means for performing all of the other functions and advantages of the embodiment disclosed in the FIG. 1 embodiment. For example, the alarm portion 130, or alarm means, cooperates with the sensors for activating an alarm when the detected level is above at least one of the plurality of sensors. Thus, the remaining portion of the FIG. 2 embodiment is easily understood by reference to both FIGS. 1 and 2 in conjunction with the present detailed description.

In operation, the embodiments of FIGS. 1 and 3 work as follows: the pressure sense tube 31a is a hollow tube that is open at the end which is to be submerged into the liquid within the sump 10, and is closed at the opposite end of the tube 31a. As the sump 10 fills with liquid, the upper surface of the liquid within the sump 10 reaches the open end of tube 31a and air is trapped inside the tube 31a. The air pressure inside this tube relative to the air pressure outside the tube is called the gauge pressure. The gauge pressure of the air inside the tube 31a is proportional to the vertical distance between the upper surface of the water and the bottom of the tube 31a. The pressure sensor/amplifier portion 30 converts the gauge pressure in the tube 31a to a proportional voltage. Thus, the output voltage of the pressure sensing portion 30 is proportional to the sump 10 liquid level relative to the bottom or opening of the tube 31a.

The output voltage of the pressure sensing portion 30 is also monitored by the overflow detect portion 110. If the sump pump 20 fails and liquid continues to drain into the sump 10, the liquid level in the sump 10 will eventually exceed the overflow level 16. When the input voltage into the overflow detect portion 110 reaches a value corresponding to the overflow level 16, the overflow detect portion 110 activates the alarm portion, and illuminates a light emitting diode D8 to indicate a sump overflow condition.

More specifically, detecting the pressure resulting from the height of the upper surface of the liquid within the sump 10, and turning the pump motor 20 either "on" or "off" when the detected pressure is either above or below, respectively, at least one first preselected pressure takes place as follows. Within the pressure sensor/amplifier portion 30, the level control portion 50, and the overflow detect portion 110, the pressure sensor 31 converts the gauge pressure in the pressure sense tube 31a to a voltage. Gauge pressures from 0 psi to 7.5 psi produce differential output voltages from 0 millivolts to 40 millivolts DC. This voltage is amplified by a first amplifier 32 and a second amplifier 34. The output voltage of the second amplifier 34 is given by the equation:

$$Vo = 4.5 - (Vp*G)$$

where Vo is the output voltage of the second amplifier 34 in volts, Vp is the output voltage of the pressure sensor 31 in volts, and G is the product of the gains of the first and second amplifiers 32,34. G is given by the equation:

$$G = 99*4200*0.00025*(15-s) = 104*(15-s)$$

Where s is the setting of the sump overflow level select switch 33. When the sump fluid level is at the lower level 12, the gauge pressure in the pressure sense tube 31a is 0 psi, the output voltage of pressure sensor 31 is 0 millivolts and the output voltage of the second amplifier 34 (Vp) is 4.5 volts. The driver 51 compares Vp to a reference voltage of 4.5 volts which is supplied by the second amplifier 34. When Vp is equal to 4.5 volts, the first and fourth output leads 52,53, of the driver 51 are both at a low logic level. This resets the flip-flop formed by the third and fourth NAND gates $A_3,A_4$ (the output of the fourth NAND gate $A_4$ is latched at a high logic level) which disables the power switch portion 70.

As the liquid level in the sump 10 increases, the output voltage of the second amplifier 34 (Vp) decreases. When Vp drops below 0.9*4.5 volts, the fourth output lead 52 of the driver 51 switches to a high logic level. When Vp drops below 0.3*4.5 volts, the first output lead 53 of the driver 51 switches to a high logic level. This causes the flip flop formed by the third and fourth NAND gates $A_3,A_4$ to become set. The output of the fourth NAND gate $A_4$ is latched at a low logic level which enables the power switch portion 70. This causes the sump pump 20 to pump liquid from the sump 10. This also causes voltage Vp to increase.

The flip flop formed by the NAND gates $A_3,A_4$ remains set until Vp rises above 0.9*4.5 volts. This occurs when the liquid level in the sump 10 drops below the low level 12. At this time, the flip flop $A_3,A_4$ is reset and the power switch portion 70 is disabled. This turns the sump pump 20 off. If the sump pump 20 fails to remove liquid from the sump 10, the fluid level will continue to rise and Vp will continue to decrease. If Vp drops below 0.2*4.5 volts (the value corresponding to a liquid level greater than the overflow level 16), the second output lead 59 of the driver 51 will switch from a low logic level to a high logic level. This will illuminate the sump overflow LED D8, and activate the alarm portion 130.

The pump motor fault detect portion 90 monitors the electrical current that flows through the sump pump 20. If this current exceeds the rated pump current for a preset length of time, the detect portion 90 will remove power from the sump pump 20 by disabling the power switch portion 70, will activate the alarm portion 130, and will turn on a light emitting diode D10 indicating a sump pump motor fault condition. The sump pump monitor will remain in this state until AC power is removed and the sump pump 20 is repaired or replaced.

More specifically, detecting a fault condition in the pump takes place as follows. When the power switch portion 70 is enabled by the level control portion 50, current begins to flow through the sump pump 20. The wire carrying the return current from the sump pump 20 passes through the center of current sense inductor L1. This wire is connected to lead 3 in FIG. 3a. An AC voltage that is proportional to the pump current appears across two current sense inductor leads 37, 95 of the current sense inductor L1. The peak to peak voltage across the current sense inductor L1 leads 37,95 is given by the equation:

$$V1 = 0.089*is$$

Where V1 is the peak-to-peak voltage across the current sense inductor leads 37,95 in volts, and "is" is the current flowing through the sump pump 20 in amps RMS. This voltage is amplified by the first amplifier 92. The AC component of the output voltage of the first amplifier 92 is given by the equation:

$$Vs = V1*0.00025*68000*(15-s)$$

Where V1 is the peak-to-peak voltage across the current sense inductor leads 37,95 of the current sense inductor L1, Vs is the peak-to-peak voltage at the output lead 102 of the first amplifier 92, and s is the switch setting of the pump motor fault sensitivity switch 91. Valid settings for this switch are 0 through hexadecimal e.

The second amplifier 93 and its associated components form a peak detector that converts the peak-to-peak voltage at the output lead 102 of the first amplifier 92 to an equal DC voltage. For example, a peak-to-peak voltage of 2 volts at the output lead 102 produces a dc voltage of 2 volts at the inverting (−) input of the second amplifier 93. When the peak-to-peak voltage at the output lead 102 of the first amplifier 92 exceeds 4.5 volts, the DC voltage at the inverting input of the second amplifier 93 rises above 4.5 volts causing the output of the fourth NOR gate $O_4$ to change from a logic high level to a logic low level. This enables an oscillator and a binary counter within the ripple counter 94. If the counter 94 is enabled for more than approximately two seconds, the output lead 112 of the counter 94 will switch from a low logic level to a high logic level. This will set the flip-flop formed by the fifth and sixth NOR gates $O_5, O_6$ (the output of the fifth NOR gate $O_5$ will be latched to a high logic level). Thus, the pump fault condition illuminates the pump fault LED, disables the power switch portion 70 and the pump 20 by removing power from the pump 20, and activates the alarm portion 130. When this occurs, the user must disconnect the sump pump 20 from the sump pump monitor and press the sump pump monitor fault reset switch S2. Pressing the switch S2 resets the flip-flop formed by the fifth and sixth NOR gates $O_5, O_6$. The sump pump motor 20 must then be repaired or replaced and reconnected to the sump pump monitor.

The triac 73 within the power switch portion 70 is controlled by the opto-isolator 71 integrated circuit. The power switch portion 70 applies 110 volts AC to the sump pump 20 when the power switch portion 70 is enabled by the level control portion 50 and the pump motor fault detect portion 90. The power switch portion 70 electrically isolates all of the other circuit portions in the sump pump monitor from the high voltage (110 volts AC) that is applied to the sump pump 20. The power switch portion 70 also contains overvoltage protection circuitry and snubber circuits which protect the triac 73 from transients that may be induced into the 110 Volt AC line by the sump pump 20 and by other devices that are also powered by this line.

More specifically, supplying power to the sump pump 20 takes place as follows. The triac 73 is used to switch 110 volts AC power to the sump pump 20. When both inputs to the third NOR gate $O_3$ are low, the second transistor Q2 switches on and allows 10 mA of current to flow through the "pump on" LED D7 and the internal LED of the opto-isolator 71. The light produced by the internal LED of the isolator 71 turns on the triac inside isolator 71. When the triac in the isolator 71 is turned on, gate current is supplied to the triac 73, enabling it to conduct. This, in turn, supplies power to the sump pump motor 20. If the pump motor fault detect portion 90 detects a current flowing through the pump motor 20 in excess of the fault current, it drives a high logic level at the input lead 75 of the third NOR gate $O_3$. This causes the second transistor Q2 to be switched off, which prevents the triac 73 from conducting. If the level control portion detects a sump liquid level that is below the low level 12 setting, it drives a high logic level at the input lead 57 of the third NOR gate $O_3$. This will also turn the second transistor Q2 off and disable the triac 73. The MOV 74 protects the triac 73 from transients produced by the inductive load of the sump pump motor 20. It limits the maximum voltage that can appear across the main leads off of the triac 73 to a safe value. The resistor R18 and the capacitor C8 in this portion 70 form a snubber circuit that limits the maximum rate of change of voltage across the main terminals of the triac 73. This ensures that the triac 73 can turn off when the triac 73 is used to switch current to the inductive load (the sump pump motor 20). The resistor R12 and the capacitor C9 perform the same function for the triac internal to the isolator 71.

The power supply/battery system 150 converts 110 volts AC power to 9 volts DC for use by the other circuit portions. This 110 volts AC power is also switched to the sump pump 20 by the power switch portion 70. The light emitting diode D6 is turned on to indicate the presence of 110 volts AC power. If the Power supply/battery system 150 senses a loss of AC power, it supplies power to the other circuit portions from a 9 V battery and turns off all light emitting diodes. Under this condition, the alarm portion 130 is switched on for a short duration at 30 second intervals to indicate the loss of AC power. In addition, if 110 volt AC power is lost, the battery backup acts as a backup 9 V DC power source for all circuit portions in the sump pump monitor except the LED indicators. If 110 volts power is lost, the LED indicators are disabled in order to extend the life of the battery. The alarm portion 130 emits a loud audible tone when enabled by the power supply/batter system 150, the pump motor fault detect portion 90, or the overflow detect portion 110.

Within power supply system 150, the second, third, and fourth capacitors C2,C3,C4 attenuate power line transients produced by other devices that draw power from the same 110 volt AC circuit as the sump pump monitor. The transformer 151 converts the 110 volt AC voltage at its primary to 10 volts AC at its secondary. The first, second, fourth, and fifth diodes D1,D2,D4,D5 full wave rectify the 10 volt AC transformer output. The fifth capacitor C5 filters the rectified AC voltage producing an unregulated DC voltage of 14 volts at the input of the voltage regulator 152. The fifth and eighth resistors R5,R8 program the voltage regulator output voltage to approximately 9.7 volts. The output of the regulator 152 charges the 9 V battery through the third diode D3 and the third resistor R3. Detecting a power failure in supplying the power takes place as follows. The switch 153 compares the output voltage, on the second connecting lead 158, of the regulator 152 to the 9 V battery voltage and switches the greater of the two to its output pin. This output supplies power to all other circuits.

If 110 volt power is lost, the switch 153 will switch the 9 V battery to its output pin and the grounding lead 133 will be grounded. Activating an alarm when a power failure is detected takes place at this point. The grounding lead 133 causes the alarm portion to pulse on for 10 milliseconds every 32 to 48 seconds. 110 Volts AC power is switched to the sump pump 20 by the power switch portion 70 when this portion 70 is enabled by the level control portion 50 and the pump motor fault detect circuit 90. Power is applied to the pump 20 when the fluid level in the sump reaches the high level 14. Power is removed from the pump after the fluid level has been reduced to the low level 12. Power is also removed from the pump 20 by the pump motor fault detect portion 90 if the pump 20 draws excessive current for more than two seconds.

Four light emitting diodes (LEDs) are used to indicate the status of the sump pump monitor. The power LED D6 is illuminated when 110 volts AC power is present at the input of the power supply system 150 and the power supply system 150 is functioning properly. The pump power LED D7 is illuminated when 110 volts AC power is being applied to the sump pump 20 by the power switch portion 70 when enabled by the level control portion 50 and the pump motor fault detect portion 90. The pump fault LED D10 is illuminated to indicate that a pump fault condition has been detected by the pump motor fault detect 90. The alarm portion 120 will be activated under this condition as well. If the liquid level in the sump 10 exceeds the overflow level 16, the sump overflow LED D8 is illuminated and the alarm portion 130 is activated.

More specifically, activating an alarm when the detected pressure is above at least one second preselected pressure takes place as follows. Alarming takes place within the alarm portion 130 which generally includes the smoke detector 131 and the piezoelectric alarm 132. The detector 131 is an oscillator that uses the piezo 132 as its resonant element. The piezo alarm 132 produces a loud audible tone when the oscillator 131 is enabled. The oscillator 131 is enabled when the input lead 135 in the oscillator 131 is driven with a low logic level and disabled when the input lead 135 is driven with a high logic level. A high logic level from the second output lead 59 of the driver 51 in the overflow detect portion 110, or a high logical level from the output lead 75 of the fifth NOR gate $O_5$ in the pump motor fault detect portion 90, will cause the output lead 135 of the fourth NOR gate $O_4$ to switch to a low logic level, enabling the alarm portion 130.

Two rotary hexadecimal switches 33,91 are provided to set the operating characteristics of the sump pump monitor. The setting of the sump overflow level select switch 33 determines the liquid level in the sump at which a sump overflow condition is reported. The setting of this switch 33 also determines the low and high fluid levels 12,14, respectively. These are the levels at which the level control portion 50 signals the switch portion 70 to remove and apply power from the sump pump 20.

The overflow fluid level 16 is given by the following equation:

$$O = s + 1$$

Where "s" is the setting of the sump overflow level select switch 33 and "o" is the overflow fluid level 16 in feet. Switch settings from 0 through hexadecimal e are allowed. The switch setting hexadecimal f is not a valid setting. For example, if the setting of the sump overflow level select switch 33 is equal to 3, the overflow fluid level is set to 4 feet. The high fluid level 14 is equal to approximately 0.80 times the overflow level 16. The lower fluid level 12 is equal to approximately 0.20 times the overflow level 16. The range of the overflow fluid level 16 setting can be increased or decreased by decreasing or increasing the product of the gains of the first and second amplifiers 32 and 34 of the sensing portion 30. For example, if the gain of the second amplifier 34 is doubled, the overflow fluid level would be given by the equation:

$$o = (s+1)/2.$$

The setting of the pump motor fault sensitivity switch 91 determines the current that the pump motor 20 must draw in order to cause the pump motor fault detect portion 90 to signal the switch portion 70 to remove power from the pump 20, illuminate the pump fault LED D10, and activate the alarm portion 130. This current level is called the fault current. The fault current "i" is given by the equation:

$$i = (s+1)/2.$$

Where "s" is the setting of the pump motor fault sensitivity switch 91, and "i" is the fault current in amps RMS. For example a switch setting of 7 sets the fault current to 4 amps RMS. A switch setting of hexadecimal f is not valid. Switch settings of 0 through hexadecimal e select fault currents of 0.5 amps RMS through 7.5 amps RMS, in 0.5 amp RMS steps. The fault current can be set to a value slightly larger than the normal operating current of the sump pump motor 20. As the friction in the motor bearings increases (due to corrosion or other factors), the steady state current that the motor draws also increases. Eventually, the current that the motor draws will be greater than the fault current. At this time, the sump pump monitor will indicate a pump motor fault condition. Thus, the sump pump monitor can call attention to a problem with pump motor before it fails completely. Note that the adjustment range of the fault current setting can be increased or decreased by decreasing or increasing the gain of the first amplifier 92 of the pump motor fault detect portion 90. For example, if the gain of the first amplifier 92 is divided by two, switch settings 0 through hexadecimal e will cause the selection fault currents of 1 amp RMS through 15 amps RMS, respectively, in 1 amp RMS steps.

The second embodiment, generally disclosed in FIG. 2, uses electrical sensors or probes 12, 14, 16, and 18 (not based on pressure) to determine the height of the liquid within the sump 10. Specifically, the probes conduct an electrical signal, and the controller determines whether a low or high resistance exists between the probes. For example, if there is a low resistance measured between the ground sensor 18 and the low level sensor (or probe) 12, then the controller assumes that the liquid level is at least above the low level sensor 12. The controller determines if the height of the liquid is above the other sensors 14, 16 in the same fashion. The resistance between the ground sensor 18 and the other sensors is what is determined within the controller. However, other electrical features can be used to determine conductivity between the ground sensor 18 and the other sensors for determining the height of the liquid within the sump 10. Hence, it should be understood that detecting the level resulting from the height of the upper surface of the liquid within the sump 10 can be performed using the plurality of sensors from the FIG. 2 alternative embodiment.

Other features of this FIG. 2 alternative embodiment are apparent when reference is made to FIG. 1, FIGS. 3 and 3a, and the specification describing the same. For example it is apparent that turning the motor either "on" or "off" when the detected level is either above or below, respectively, at least one first preselected level takes place based on detection by the plurality of sensors instead of the single pressure tube 31a and sensor 31.

In conclusion, it will be understood that the invention may be embodied in other specific forms without departing from the spirit or central characteristics thereof. The present examples and embodiments, therefore, are to be considered in all respects as illustrative and not restrictive, and the invention is not to be limited to the details given herein. The scope of protection is only limited by the scope of the accompanying claims.

We claim:

1. An apparatus for monitoring and controlling a motor driven sump pump for a sump having a liquid with a height of an upper surface of the liquid therein, comprising:

pressure sensing means for detecting a pressure resulting from the height of the upper surface of the liquid within the sump, and including a means for converting the detected resulting pressure into a continuous electrical signal, wherein the continuous electrical signal represents the height of the upper surface of the liquid within the sump; and, control means comparing the continuous electrical signal to a first preselected electrical signal level that represents at least a first preselected pressure for turning the motor either "on" or "off" when the detected pressure is either above or below the first preselected pressure.

2. The apparatus of claim 1 wherein the pressure sensing means includes a pressure sensing tube having an opening and a sensor therein, the opening being submerged in and below the upper surface of the liquid within the sump and the sensor detecting pressure in the tube, the pressure in the tube being proportional to the height of the upper surface of the liquid within the sump.

3. The apparatus of claim 1 further including first alarm means cooperating with the pressure sensing means for activating an alarm when the detected pressure is above a second preselected pressure.

4. The apparatus of claim 3 wherein the pressure sensing means includes a pressure sensing tube having an opening and a sensor therein, the opening being submerged in and below the upper surface of the liquid within the sump and the sensor detecting pressure in the tube, the pressure in the tube being proportional to the height of the upper surface of the liquid within the sump.

5. The apparatus of claim 3 further including power means for supplying power to the apparatus;

power detection means for detecting a power failure in the power means; and, second alarm means for activating an alarm when the power detection means detects a power failure in the power means.

6. The apparatus of claim 5 wherein the pressure sensing means includes a pressure sensing tube having an opening and a sensor therein, the opening being submerged in and below the upper surface of the liquid within the sump and the sensor detecting pressure in the tube, the pressure in the tube being proportional to the height of the upper surface of the liquid within the sump.

7. The apparatus of claim 5 further including
fault detection means for detecting a fault condition in the pump; and,
third alarm means for activating an alarm when the fault detection means detects a fault condition in the pump.

8. The apparatus of claim 7 further including disabling means for disabling the pump when the fault detection means detects a fault condition in the pump.

9. The apparatus of claim 8 wherein the pressure sensing means includes a pressure sensing tube having an opening and a sensor therein, the opening being submerged in and below the upper surface of the liquid within the sump and the sensor detecting pressure in the tube, the pressure in the tube being proportional to the height of the upper surface of the liquid within the sump.

10. An apparatus for monitoring and controlling a motor driven sump pump for a sump having a liquid with a height of an upper surface of the liquid therein, comprising:
power means for supplying power to the apparatus;
pressure sensing means for detecting a pressure resulting from the height of the upper surface of the liquid within the sump, and including a means for converting the detected resulting pressure into a continuous electrical signal, wherein the continuous electrical signal represents the height of the upper surface of the liquid within the sump;
control means comparing the continuous electrical signal to a first preselected electrical signal level that represents at least a first preselected pressure for turning the motor either "on" or "off" when the detected pressure is either above or below the first preselected pressure;
first alarm means cooperating with the sensor for activating an alarm when the detected pressure is above at least a second preselected pressure;
power detection means for detecting a power failure in the power means;
second alarm means for activating an alarm when the power detection means detects a power failure in the power means;
fault detection means for detecting a fault condition in the pump;
third alarm means for activating an alarm when the fault detection means detects a fault condition in the pump; and,
disabling means for disabling the pump when the fault detection means detects a fault condition in the pump.

11. The apparatus of claim 10 wherein the pressure sensing means includes a pressure sensing tube having an opening and therein, the opening being submerged in and below the upper surface of the liquid within the sump and the sensor detecting pressure in the tube, the pressure in the tube being proportional to the height of the upper surface of the liquid within the sump.

12. An apparatus for monitoring and controlling a motor driven sump pump for a sump having a liquid with a height of an upper surface of the liquid therein, comprising:
pressure sensing means for detecting both an atmospheric pressure and a pressure resulting from the height of the upper surface of the liquid within the sump;
conversion means for comparing the atmospheric pressure and the detected pressure resulting from the height of the upper surface of the liquid within the sump for generating a gauge pressure, and for converting the gauge pressure into a continuous electrical signal, wherein the continuous electrical signal represents the height of the upper surface of the liquid within the sump; and,
control means cooperating with the conversion means for comparing the continuous electrical signal to a first preselected electrical signal level that represents at least a first preselected pressure, and for turning the motor either "on" or "off" when the gauge pressure is either above or below the first preselected pressure.

13. The apparatus of claim 12 wherein the pressure sensing means includes a pressure sensing tube having an opening and a sensor for detecting a differential pressure, the opening being submerged in and below the upper surface of the liquid within the sump and the sensor detecting the differential pressure between the pressure outside the tube and the pressure within the tube, the pressure in the tube being proportional to the height of the upper surface of the liquid within the sump.

14. The apparatus of claim 12 further including first alarm means cooperating with the conversion means for activating an alarm when the gauge pressure is above at least one second preselected pressure.

15. The apparatus of claim 14 further including
power means for supplying power to the apparatus;
power detection means for detecting a power failure in the power means; and,
second alarm means for activating an alarm when the power detection means detects a power failure in the power means.

16. The apparatus of claim 15 further including:
fault detection means for detecting a fault condition in the pump; and,
third alarm means for activating an alarm when the fault detection means detects a fault condition in the pump.

17. The apparatus of claim 16 further including disabling means for disabling the pump when the fault detection means detects a fault condition in the pump.

18. The apparatus of claim 17 wherein the pressure sensing means includes a pressure sensing tube having an opening at one end and a sensor at an opposed end of the tube for detecting a differential pressure, the opening being submerged in and below the upper surface of the liquid within the sump and the sensor detecting the differential pressure between the pressure outside the tube and the pressure inside the tube, the pressure in the tube being proportional to the height of the upper surface of the liquid within the sump.

19. The apparatus of claim 17 wherein the first alarm means cooperating with the conversion means for activating an alarm when the gauge pressure is above at least one second preselected pressure is connected to a first light emitting element that indicates when the alarm is activated, the second alarm means for activating an alarm when the power detection means detects a power failure in the power means is connected to a second light emitting element that indicates when the alarm is activated, and the third alarm means for activating an alarm when the fault detection means detects a fault condition in the pump is connected to a third light emitting element that indicates when the alarm is activated.

20. The apparatus of claim 15 further including
power backup means cooperating with the power detection means for activating when the power detection means detects a power failure in the power means; and, third alarm means for activating an alarm when the power backup means is activated.

21. The apparatus of claim 20 further including fault detection means for detecting a fault condition in the pump; and, fourth alarm means for activating an alarm when the fault detection means detects a fault condition in the pump; and, disabling means for disabling the pump when the fault detection means detects a fault condition in the pump.

22. The apparatus of claim 21 wherein the pressure sensing means includes a pressure sensing tube having an opening and a sensor for detecting a differential pressure, the opening being submerged in and below the upper surface of the liquid within the sump and the sensor detecting the differential pressure between the pressure outside the tube and the pressure inside the tube, the pressure in the tube being proportional to the height of the upper surface of the liquid within the sump.

23. The apparatus of claim 22 wherein the first alarm means cooperating with the conversion means for activating an alarm when the gauge pressure is above at least one second preselected pressure is connected to a first light emitting element that indicates when the alarm is activated, the second alarm means for activating an alarm when the power detection means detects a power failure in the power means is connected to a second light emitting element that indicates when the alarm is activated, and the third alarm means for activating an alarm when the fault detection means detects a fault condition in the pump, the third alarm means being connected to a third light emitting element that indicates when the alarm is activated.

24. An apparatus for monitoring and controlling a motor driven sump pump for a sump having a liquid with a height of an upper surface of the liquid therein, comprising:

a plurality of sensors for detecting the height of the upper surface of the liquid within the sump, the plurality of sensors including a ground level sensor, a low level sensor, a high level sensor, and an overflow level sensor; and, control means cooperating with the sensors for at least turning the motor either "on" or "off" when the upper surface is either above or below one of the sensors.

25. The apparatus of claim 24 further including first alarm means cooperating with the sensors for activating an alarm when the detected level is above at least one of the plurality of sensors.

26. The apparatus of claim 25 wherein the plurality of sensors include a ground level sensor, a low level sensor, a high level sensor, and an overflow level sensor.

27. The apparatus of claim 25 further including power means for supplying power to the apparatus;

power detection means for detecting a power failure in the power means; and, second alarm means for activating an alarm when the power detection means detects a power failure in the power means.

28. The apparatus of claim 27 further including:

fault detection means for detecting a fault condition in the pump; and, third alarm means for activating an alarm when the fault detection means detects a fault condition in the pump.

29. The apparatus of claim 28 further including disabling means for disabling the pump when the fault detection means detects a fault condition in the pump.

30. A method for monitoring and controlling a motor driven sump pump for a sump having a liquid with a height of an upper surface of the liquid therein, comprising the steps of:

detecting a pressure resulting from the height of the upper surface of the liquid within the sump;

converting the detected resulting pressure into a continuous electrical signal, wherein the continuous electrical signal represents the height of the upper surface of the liquid within the sump;

comparing the continuous electrical signal to a first preselected electrical signal level that represents at least a first preselected pressure; and, turning the motor either "on" or "off" when the detected pressure is either above or below the first preselected pressure.

31. The method of claim 30 further including the step of activating an alarm when the detected pressure is above at least one second preselected pressure.

32. The method of claim 30 further including the step of supplying power to the sump pump;

detecting a power failure in supplying the power; and, activating an alarm when a power failure is detected.

33. The method of claim 32 wherein the step of detecting the pressure resulting from the height of the upper surface of the liquid within the sump includes the step of positioning a pressure sensing tube having an opening and a sensor therein, such that the opening is submerged in and below the upper surface of the liquid within the sump, and the step of detecting pressure in the tube with the sensor, the pressure in the tube being proportional to the height of the upper surface of the liquid within the sump.

34. The method of claim 33 further including the steps of detecting a fault condition in the pump; and, activating an alarm when a fault condition is detected in the pump.

35. The method of claim 34 further including the step of disabling the pump when a fault condition is detected in the pump.

36. A method for monitoring and controlling a motor driven sump pump for a sump having a liquid with a height of an upper surface of the liquid therein, comprising the steps of supplying power to the sump pump;

detecting a pressure resulting from the height of the upper surface of the liquid within the sump;

converting the detected resulting pressure into a continuous electrical signal, wherein the continuous electrical signal represents the height of the upper surface of the liquid within the sump;

comparing the continuous electrical signal to a first preselected electrical signal level that represents at least a first preselected pressure;

turning the motor either "on" or "off" when the detected pressure is either above or below the first preselected pressure;

activating an alarm when the detected pressure is above at least one second preselected pressure;

detecting a power failure in supplying the power;

activating an alarm when a power failure is detected;

detecting a fault condition in the pump;

activating an alarm when a fault condition is detected in the pump; and, disabling the pump when a fault condition is detected in the pump.

37. The method of claim 36 wherein the step of detecting the pressure resulting from the height of the upper surface of the liquid within the sump includes the step of positioning a pressure sensing tube having an opening and a sensor therein, such that the opening is submerged in and below the upper surface of the liquid within the sump, and the step of detecting pressure in the tube with the sensor, the pressure in the tube being proportional to the height of the upper surface of the liquid within the sump.

38. An apparatus for monitoring and controlling a motor driven sump pump for a sump having a liquid with a height of an upper surface of the liquid therein, comprising:

AC power means having an AC power level, for supplying power to the apparatus;

AC power detection means for the AC power level in the AC power means, and for creating a detected AC power level;

control means for comparing the detected AC power level to a first predetermined value that represents a first predetermined AC power level;

alarm means activated by the control means when the detected AC power level is above or below the first predetermined AC power level; and, pressure sensing means for detecting a pressure resulting from the height of the upper surface of the liquid within the sump, and including a means for converting the detected resulting pressure into a continuous electrical signal, wherein the continuous electrical signal represents the height of the upper surface of the liquid within the sump, and wherein the control means also compares the continuous electrical signal to a first preselected electrical signal level that represents at least a first preselected pressure for turning the motor either "on" or "off" when the detected pressure is either above or below the first preselected pressure.

* * * * *